United States Patent [19]

Spivack et al.

[11] 3,839,277
[45] Oct. 1, 1974

[54] LIGHT STABILIZED POLYOLEFIN COMPOSITIONS

[75] Inventors: John D. Spivack, Spring Valley; Peter P. Klemchuk, Yorktown Heights, both of N.Y.

[73] Assignee: Ciba-Geigy Corporation, Ardsley, N.Y.

[22] Filed: Mar. 8, 1973

[21] Appl. No.: 339,478

[52] U.S. Cl. .................................. 260/45.75 N, 260/45.8 N, 260/45.85 B, 260/45.85 S, 260/45.95 H, 260/45.95 D
[51] Int. Cl. ............................................. C08f 45/58
[58] Field of Search ..................... 260/45.75 N, 45.95 H, 45.95 D, 260/45.8 N, 45.85 S, 45.85 B

[56] References Cited
UNITED STATES PATENTS

| | | | |
|---|---|---|---|
| 3,189,630 | 6/1965 | Smutny | 260/45.75 |
| 3,206,431 | 9/1965 | Doyle et al. | 260/45.85 |
| 3,285,855 | 11/1966 | Dexter et al. | 260/45.85 |
| 3,367,870 | 2/1968 | Spivack | 260/45.85 |
| 3,531,483 | 9/1970 | Gilles | 260/45.8 |
| 3,646,110 | 2/1972 | Eggensperger et al. | 260/45.85 |

Primary Examiner—V. P. Hoke

[57] ABSTRACT

Organic polymeric materials normally subject to oxidative and ultraviolet light deterioration are stabilized by incorporating therein a nickel-bis-3,5-dialkyl-4-hydroxybenzoate, a light stabilizer such as p-hydroxybenzoate ester and optionally a primary phenolic antioxidant with or without a secondary sulfur containing antioxidant.

6 Claims, No Drawings

LIGHT STABILIZED POLYOLEFIN COMPOSITIONS

DETAILED DESCRIPTION

This invention relates to the stabilization of organic materials normally subject to deterioration by exposure to heat and light by incorporating therein a combination of additives comprising a nickel salt of 3,5-dialkyl-4-hydroxybenzoic acid, an ultraviolet light stabilizer and optionally, a primary phenolic antioxidant with or without a secondary sulfur containing antioxidant.

The stabilization system of the present invention is useful for stabilizing organic materials normally subject to oxidative, thermal and ultraviolet light deterioration. Materials which are thus stabilized include synthetic organic polymeric substances such as styrene, including homopolystyrene and copolymers with acrylonitrile and/or butadiene; vinyl resins formed from the polymerization of vinyl halides or from copolymerization of vinyl halides with unsaturated polymerizable compounds, for example, vinyl esters, $\alpha,\beta$-unsaturated acids, $\alpha,\beta$-unsaturated esters, and unsaturated hydrocarbons such as butadienes and styrene; poly-$\alpha$-olefins such as high, medium and low density polyethylene, cross-linked polyethylene, polypropylene, poly(4-methylpentene-1), polybutene-1, and the like including copolymers of poly-$\alpha$-olefins such as ethylene-propylene, ethylenebutylene copolymers, and the like; polybutadiene; polyisoprene; polyurethanes such as are prepared from polyols such as propylene glycol and ethylene glycol and organic polyisocyanate; polyamides such as polyhexamethylene adipamide and polycaprolactam; polyesters such as polymethyleneterephthalate and polyethyleneterephthalate; polycarbonates such as those prepared from bisphenol-A and phosgene; polyacetals; polyethylene oxide and polypropylene glycol; and polyacrylics such as polyacrylonitrile and polymethylmethacrylate; polyphenylene-oxides such as those prepared from 2,6-dimethylphenol and the like. Particularly preferred polymers for the compositions of this invention are those normally solid polymers of alpha-olefins having up to three carbon atoms, e.g., ethylene, propylene and their copolymers.

The nickel derivatives of 3,5-dialkyl-4-hydroxybenzoic acid of this invention are represented by the formula

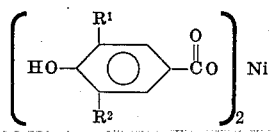

I wherein $R^1$ and $R^2$ are the same or different and each is a (lower)alkyl group containing from one to eight carbon atoms.

Illustrative of the (lower)alkyl groups as represented by $R^1$ and $R^2$ include methyl, ethyl, propyl, isopropyl, butyl, t-butyl, pentyl, hexyl, and octyl. The most preferred groups are methyl and t-butyl.

The nickel salts are prepared according to procedures described in U.S. Pat. No. 3,189,630.

The nickel compounds of formula I are added to the polymer substrate in an amount of from about 0.001 to about 5 percent by weight based on the weight of the polymer and preferably from 0.05 to 2 percent.

The ultraviolet light stabilizers that are employed in this invention are p-hydroxybenzoates having the general formula

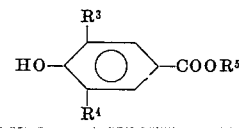

II wherein $R^3$ is (lower)alkyl containing from one to six carbon atoms, $R^4$ is hydrogen or (lower)alkyl containing from one to six carbon atoms, and $R^5$ is alkyl or alkenyl from one to 20 carbon atoms, phenyl, lower alkyl substituted phenyl, benzyl or lower alkyl substituted benzyl groups, such that no more than two lower alkyl substituents are present on said phenyl or benzyl groups.

In a preferred embodiment, $R^3$ and $R^4$ are t-butyl or t-amyl groups and $R^5$ is a di(lower alkyl) phenyl group. Illustrative examples of hydroxybenzoates are given below.

(2',4'-di-t-butylphenyl)-3,5-di-t-butyl-4-hydroxybenzoate
methyl-3-methyl-5-isopropyl-4-hydroxybenzoate
ethyl-3,5-diisopropyl-4-hydroxybenzoate
propyl-3,5-di-sec-butyl-4-hydroxybenzoate
isobutyl-3,5-di-tert-amyl-4-hydroxybenzoate
decyl-3,5-di-tert-octyl-4-hydroxybenzoate
cyclohexyl-3,5-di-tert-amyl-4-hydroxybenzoate
dodecyl-3-methyl-5-isoamyl-4-hydroxybenzoate
octadecyl-3,5-diisopropyl-4-hydroxybenzoate
hexadecyl-3,5-di-tert-butyl-4-hydroxybenzoate
chloromethyl-3,5-di-tert-butyl-4-hydroxybenzoate
3-fluoropropyl-3,5-di-tert-amyl-4-hydroxybenzoate
allyl-3,5-di-tert-butyl-4-hydroxybenzoate
2-butenyl-3,5-diisopropyl-4-hydroxybenzoate
oleyl-5-methyl-5-tert-amyl-4-hydroxybenzoate
phenyl-3,5-diisopropyl-4-hydroxybenzoate
p-octylphenyl-3,5-di-tert-amyl-4-hydroxybenzoate
(2',4'-dimethylphenyl)-3,5-di-tert-octyl-4-hydroxybenzoate
p-isopropylphenyl-3-methyl-5-tert-amyl-4-hydroxybenzoate
naphthyl-3,5-di-tert-butyl-4-hydroxybenzoate
6-methylnaphthyl-3,5-di-tert-hexyl-4-hydroxybenzoate
p-chlorophenyl-3,5-di-tert-butyl-4-hydroxybenzoate
2,4-dibromophenyl-3,5-diisopropyl-4-hydroxybenzoate The p-hydroxybenzoate light stabilizers of Formula II are added to the polymer substrate in an amount of from about 0.01 to 5 percent by weight based on the weight of polymer, and more preferably from 0.05 to 2 percent.

In addition to the actinic stabilizers described, the plastic compositions may contain other additives such as plasticizers, pigments, fillers, dyes, glass or other fibers, phosphites, thermal antioxidants, and the like. For example in most applications, it is desirable to incorporate into the resin composition, sufficient thermal antioxidants to protect the plastic against thermal and oxidative degradation. Thus, the amount of antioxidant in the compositions of the instant invention may range from 0 to about 5 percent by weight based on the weight of the polymer and when used preferably from 0.01 to 2 percent by weight.

The best results are obtained with the preferred class of thermal antioxidants, namely, hindered phenols. These compounds are considered primary antioxidants and have been found to provide the best thermal stabilization with the least discoloration in the compositions of the invention. Examples of these phenolic antioxidants include the following:

1. Phenolic compounds having the formula:

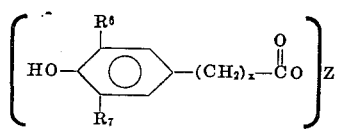

III wherein
$R^6$ and $R^7$ are the same or different and each is a (lower)alkyl group containing from one to six carbon atoms,
$x$ is an integer of from 1 to 4,
$n$ is an integer of from 1 to 4, and
$Z$ is an aliphatic hydrocarbon of the formula $$C_yH_{2y+2-n}$$

in which $y$ has a value of from 2 to 18 when $n$ is 1 or 2 and a value of from 3 to 6 when $n$ is greater than 2.

Illustrative examples of such compounds are
n-octadecyl-3-(3,5-di-t-butyl-4-hydroxyphenyl)-propionate
n-octadecyl-2-(3,5-di-t-butyl-4-hydroxyphenyl)-acetate
n-octadecyl-4-(3,5-di-t-butyl-4-hydroxyphenyl) butyrate
n-hexyl-3,5-di-t-butyl-4-hydroxyphenyl-propionate
n-dodecyl-3,5-di-t-butyl-4-hydroxyphenyl-propionate
neo-dodecyl-3-(3,5-di-t butyl-4-hydroxyphenyl)-propionate
dodecyl-β-(3,5-di-t-butyl-4-hydroxyphenyl)-propionate
ethyl-α-(4-hydroxy-3,5-di-t-butylphenyl)-isobutyrate
octadecyl α-(4-hydroxy-3,5-di-t-butylphenyl)-isobutyrate
octadecyl α-(4-hydroxy-3,5-di-t-butylphenyl)-propionate
1,2-propylene glycol bis-{3-(3,5-di-t-butyl-4-hydroxyphenyl)propionate}
ethylene glycol bis-{3-(3,5-di-t-butyl-4-hydroxyphenyl)propionate}
neopentylglycol bis-{3-(3,5-di-t-butyl-4-hydroxyphenyl)propionate}
ethylene glycol bis-(3,5-di-t-butyl-4-hydroxyphenylacetate)
glycerine 1-n-octadecanoate-2,3-bis-(3,5-di-t-butyl-4-hydroxyphenylacetate
pentaerythritol-tetrakis-{3-(3',5'-di-t-butyl-4'-hydroxyphenyl)propionate}
1,1,1-trimethylol ethane-tris-3-(3,5-di-t-butyl-4-hydroxyphenyl)propionate
sorbitol a-{3-(3,5-di-t-butyl-4-hydroxyphenyl)-propionate}
1,2,3-butanetriol bis-{3-(3,5-di-t-butyl-4-hydroxyphenyl)propionate}
2-hydroxyethyl 7-(3-methyl-5-t-butyl-4-hydroxyphenyl)heptanoate
2-stearoyloxyethyl 7-(3-methyl-5-t-butyl-4-hydroxyphenyl)heptanoate
1,6-n-hexanediol bis{(3',5'-di-t-butyl-4-hydroxyphenyl)propionate}.

The above phenolic ester stabilizers are more fully described in U.S. Pat. Nos. 3,330,859 and 3,644,482.

2. Phenolic compounds having the formula

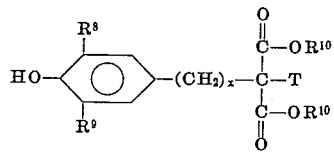

IV wherein
T is hydrogen or

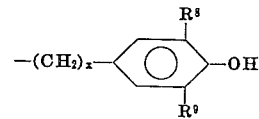

$R^8$ and $R^9$ are the same or different and each is (lower)alkyl group containing from one to six carbon atoms,
$R^{10}$ is an alkyl group containing from one to 18 carbon atoms, and
$x$ is an integer of from 1 to 4.

Illustrative examples of the compounds shown above are
di-n-octadecyl-α-(3,5-di-t-butyl-4-hydroxybenzyl)-malonate
di-n-octadecyl-α-(3-t-butyl-4-hydroxy-5-methyl-benzyl)malonate which is disclosed in the Netherlands Patent No. 6,711,199, Feb. 19, 1968
di-n-octadecyl-α,α'-bis-(3-t-butyl-4-hydroxy-5-methylbenzyl)malonate which is disclosed in the Netherlands Patent No. 6,803,498, Sept. 19, 1968.

3. Phenolic compounds having the formula

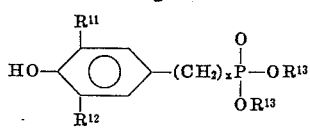

wherein
R[11] and R[12] are the same or different and each is a (lower)alkyl group containing from one to six carbon atoms, $x$ is an integer of from 1 to 4, and R[13] is an alkyl group containing from six to 18 carbon atoms.

Illustrative examples of such compounds are
di-n-octadecyl-3,5-di-t-butyl-4-hydroxy-benzylphosphonate
di-n-octadecyl-1-(3,5-di-t-butyl-4-hydroxyphenyl)-ethanephosphonate
di-n-tetradecyl-3,5-di-t-butyl-4-hydroxy-benzylphosphonate
di-n-hexadecyl-3,5-di-t-butyl-4-hydroxy-benzylphosphonate
di-n-dodecyl-3,5-di-t-butyl-4-hydroxy-benzylphosphonate The above di-(higher)alkyl phenolic phosphonates are more fully described in U.S. Pat. No. 3,281,505.

4. Phenolic compounds having the formula

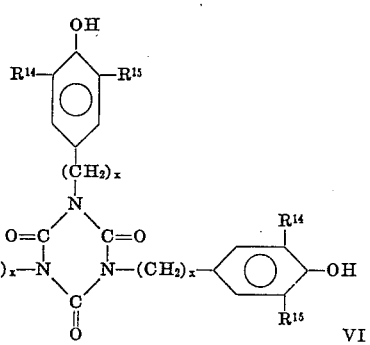

wherein
R[14] and R[15] are the same or different and each is a lower alkyl group containing from one to six carbon atoms, and $x$ is an integer of from 1 to 4.

Illustrative examples of such compounds are
tris-(3,5-di-t butyl-4-hydroxybenzyl)isocyanurate
tris-(3-t-butyl-4-hydroxy-5-methylbenzyl)isocyanurate.

The above hydroxyphenylalkenyl isocyanurates are more fully described in U.S. Pat. No. 3,531,483.

The above phenolic hydrocarbon stabilizers are known and many are commercially available.

In addition to the above mentioned additives the present invention also covers the use of a secondary antioxidant which may optionally be employed with the primary phenolic antioxidant. Illustrative examples or such secondary antioxidants are the organo sulfur compounds distearylthiodipropionate and dilaurylthiodipropionate. The secondary antioxidants may be used in an amount ranging from 0 to about 5 percent by weight based on the weight of polymer and when used preferably from 0.01 to 2 percent by weight.

The stabilized polymers of the present invention have utility in the normal use for which plastics are employed and are particularly useful for film and fiber. Compounds of this invention may be incorporated in the polymeric substance during the usual processing operations for example, by hot milling, the composition then being extruded, pressed, blow molded or the like into films, fibers, filaments, hollow spheres and the like. Where the polymer is prepared from a liquid monomer as in the case of styrene, the stabilizer may be dispersed or dissolved in the monomer prior to polymerization or curing.

The following examples, presented for illustration and not limitation, will further serve to typify the nature of the present invention.

EXAMPLE 1

Artificial Light Exposure Test

Deterioration of most polymers caused by ultraviolet light is slow at ambient conditions and therefore, testing of the effects of stabilizers generally is conducted in an accelerated artificial light exposure device in order to yield results in a convenient period of time. The test conducted on polymers using an artificial light exposure device is described below:

a. Sample Preparation 5 mil Film — The additives are dissolved in distilled methylene chloride and blended with unstabilized polypropylene powder (Hercules Profax 6501) in a Hobart mixer. The blended material is then milled on a two roll mill for 5 minutes at 182°C. The milled sheet is then compression molded at 220°C into 5 mil thick film under a pressure of 350 psi and water cooled in the press.

b. Testing Method

This test is conducted in a FS/BL unit, basically of the American Cyanamid design which consists of 40 tubes of alternating fluorescent sun lamps and black lights (20 of each). The 5 mil sample films are mounted on 3 × 2 inch infrared card holders with ¼ × 1 inch windows and are placed on a rotating drum 2 inches from the bulbs in the FS/BL unit. The time in hours is noted for the development of 0.5 carbonyl absorbance units at 5.85 nanometers as determined on an Infrared Spectophotometer. The development of carbonyl functional groups in the polymer is proportional to the amount of degradation caused by the ultraviolet light exposure.

The test results reported below were obtained according to the procedures described above. The amounts of the additives are expressed in weight percent based on the weight of the polymer.

TABLE I

| Composition | Time in Hours to .5 Carbonyl Absorbance Units |
|---|---|
| 0.25% 2,4-di-tert-butylphenyl 3,5-di-tert-butyl-4-hydroxybenzoate 0.5% nickel-bis-3,5-di-tert-butyl-4-hydroxybenzoate | 3725 |
| 0.25% n-octadecyl-3,5-di-tert-butyl-4-hydroxybenzoate 0.5% nickel-bis-di-tert-butyl-4-hydroxybenzoate | 3725 |

TABLE I-Continued

| Composition | Time in Hours to .5 Carbonyl Absorbance Units |
|---|---|
| 0.1% octadecyl 3-(3',5'-di-tert-butyl-4'-hydroxyphenyl)propionate 0.25% 2,4-di-tert-butylphenyl 3,5-di-tert-butyl-4-hydroxybenzoate 0.25% nickel-bis-3,5-di-tert-butyl-4-hydroxybenzoate | 2304 |
| No stabilizers | 168 |
| 0.5% nickel-bis-3,5-di-tert-butyl-4-hydroxybenzoate | 1970 |

Other hindered phenolic antioxidants may be used in place of octadecyl 4-(3,5-di-t-butyl-4-hydroxyphenyl)-propionate in the above mentioned compositions utilizing a hindered phenolic, for example, di-n-octadecyl α(3-butyl-4-hydroxy-5-methylbenzyl) malonate, dioctadecyl 3-(3',5'-di-t-butyl-4'-hydroxybenzyl)phosphonate, pentaerythritol-tetrakis-{3-(3,5-di-t-butyl-4-hydroxyphenyl)propionate} and tris(3,5-di-t-butyl-4-hydroxybenzyl)isocyanurate, respectively. Together with these antioxidants, the secondary antioxidant, distearylthiodipropionate (DSTDP) may also be used in an amount of 0.1 percent by weight based on the weight of the polymer.

EXAMPLE 2 a. A composition comprising acrylonitrile-butadiene-styrene terpolymer and 0.5 percent of nickel-bis-3,5-di-tert-butyl-4-hydroxybenzoate, and 0.25 percent of n-octadecyl-3,5-di-tert-butyl-4-hydroxybenzoate resists embrittlement due to exposure to ultraviolet light longer than one which does not contain the stabilizer.

b. A composition comprising a polyurethane prepared from toluene diisocyanate and alkylene polyols (such as polyethylene glycol and polypropylene glycol) and 0.5 percent by weight of nickel-bis-3,5-di-tert-butyl-4-hydroxybenzoate, and 0.25 percent 2,4-di-t-butylphenyl 3,5-di-tert-butyl-4-hydroxybenzoate is more stable to sunlight, fluorescent sunlamps, black lights and fluorescent lights than the unformulated polyurethane.

c. A composition comprising a polycarbonate prepared from bisphenol-A and phosgene and 0.5 percent by weight of nickel-bis-3,5-di-tert-butyl-4-hydroxybenzoate, 0.1 percent of O,O'-di-octadecyl-3,5-di-tert-butyl-4-hydroxy phosphonate benzyl and 0.5 percent of n-octadecyl-3,5-di-t-butyl-4-hydroxybenzoate resists discoloration due to exposure to ultraviolet light longer than one which does not contain the stabilizer.

d. A composition comprising a polyester (polyethyleneterephthalate) and 0.5 percent by weight of nickel-bis-3,5-di-tert-butyl-4-hydroxybenzoate, 0.1 percent tetrakis-{methylene-3-(3',5'-di-tert-butyl-4'-hydroxyphenyl)-propionate} methane and 0.5 percent of 2,4-di-t-butylphenyl 3,5-di-tert-butyl-4-hydroxybenzoate resists discoloration due to exposure to ultraviolet light longer than one which does not contain the stabilizer.

e. A composition comprising polymethylmethaacrylate and 0.1 percent of octadecyl-3-(3',5'-di-tert-butyl-4'-hydroxyphenyl)propionate, 0.5 percent of nickel-bis-3,5-di-tert-butyl-4-hydroxybenzoate, and 0.5 percent n-octadecyl-3,5-di-tert-butyl-4-hydroxybenzoate resists discoloration due to exposure to ultraviolet light longer than one which does not contain the stabilizer.

EXAMPLE 3 a. A stabilized linear polyethylene is prepared by incorporating therein 0.1 percent by weight of n-octadecyl-3-(3',5'-di-tert-butyl-4'-hydroxyphenyl)propionate, 0.25 percent nickel bis-3,5-di-tert-butyl-4-hydroxybenzoate, and 0.25 percent of n-octadecyl-3,5-di-tert-butyl-4-hydroxybenzoate. The stabilized compositions resist embrittlement due to exposure to ultraviolet light longer than one which does not contain the stabilizer.

b. A stabilized polyamide (nylon 6,6) is prepared by incorporating therein 0.1 percent by weight of octadecyl 3-(3',5'-di-tert-butyl-4'-hydroxybenzoate), 0.5 percent nickel-bis-3,5-di-tert-butyl-4-hydroxybenzoate, and 0.5 percent n-octadecyl-3,5-di-tert-butyl-4-hydroxybenzoate. The light stability of the stabilized composition is superior to that of an unstabilized polyamide.

c. A stabilized polyphenylene oxide polymer (prepared by polymerizing 2,6-dimethylphenol) is prepared by incorporating therein 0.1 percent by weight of octadecyl-3-(3',5'-di-tert-butyl-4'-hydroxyphenyl) propionate, 0.25 percent nickel-bis-3,5-di-tert-butyl-4-hydroxybenzoate, and 0.25 percent of 2,4-di-t-butylphenyl 3,5-di-tert-butyl-4-hydroxybenzoate. The stabilized compositions resist embrittlement due to exposure to ultraviolet light longer than one which does not contain the stabilizer.

d. A stabilized crystalline polystyrene is prepared by incorporating therein 0.1 percent by weight of octadecyl-3-(3',5'-di-tert-butyl-4'-hydroxyphenyl) propionate, 0.3 percent of distearylthiodipropionate, 0.5 percent of nickel-bis-3,5-di-tert-butyl-4-hydroxybenzoate and 0.5 percent of 2,4-di-t-butylphenyl 3,5-di-tert-butyl-4-hydroxybenzoate. The stabilized compositions resist embrittlement due to exposure to ultraviolet light longer than one which does not contain the stabilizer.

EXAMPLE 4

High impact polystyrene resin containing elastomer (i.e., butadiene-styrene) is stabilized against loss of elongation properties due to exposure to ultraviolet light by incorporation of 0.5 percent by weight of nickel bis-3,5-di-tert-butyl-4-hydroxybenzoate, and 0.5 percent n-octadecyl-3,5-di-tert-butyl-4-hydroxybenzoate.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2000 pounds per square inch into a sheet of uniform thickness (25 mil). The sheets are then cut into strips approximately 4 × 0.5 inches. A portion of these strips is then measured for percent of elongation in the Instron Tensile Testing Apparatus (Instron Engineering Corporation, Quincy, Massachusetts). The remaining portion of the strips are placed in an FS/BL chamber according to Example 3

(b) except that the time to 50% reduction in elongation is measured. The stabilized polystyrene resin retains its elongation property longer than the unstabilized resin.

Similar results are obtained when the following stabilizer composition is used in place of the above mentioned stabilizer composition 0.5% nickel-bis-3,5-di-tert-butyl-4-hydroxybenzoate 0.5% 2,4-di-t-butylphenyl 3,5-di-tert-butyl-4-hydroxybenzoate.

Antioxidants may also be incorporated in an amount of 0.1 percent by weight into each of the above mentioned compositions for example, di-n-octadecyl-α,α'-bis(3-t-butyl-4-hydroxy-5-methylbenzyl)malonate, pentaerythritol-tetrakis-{3-(3,5-di-t-butyl-4-hydroxyphenyl)propionate}, tris-(3,5-di-t-butyl-4-hydroxybenzyl)isocyanurate, di-n-octadecyl-3,5-di-butyl-4-hydroxybenzyl phosphonates and n-octadecyl-3(3',5'-di-t-butyl-4-hydroxyphenyl)-propionate respectively. Together with these antioxidants, the secondary antioxidant, dilaurylthiodipropionate, may also be used in an amount of 0.3 percent by weight based on the weight of the polymer.

What is claimed is:

1. A composition of matter stabilized against oxidative and ultraviolet light deterioration which comprises a. an α-polyolefin normally subject to ultraviolet and oxidative deterioration which contains from two to four carbon atoms;
b. from 0.001 to 5 percent by weight based on the weight of polymer of nickel-bis-3,5-di-t-butyl-4-hydroxybenzoate;
c. from 0.01 to 5 percent by weight based on the weight of polymer of a benzoate co-light stabilizer selected from n-octadecyl-3,5-di-t-butyl-4-hydroxybenzoate or 2,4-di-t-butylphenyl 3,5-di-t-butyl-4-hydroxybenzoate;
d. from 0 to 5 percent by weight based on the weight of polymer of a phenolic antioxidant selected from n-octadecyl-3,5-di-t-butyl-4-hydroxyphenylpropionate, tetrakis-{methylene 3-(3',5'-di-t-butyl-4'-hydroxyphenyl)propionate} methane, di-n-octadecyl-3,5-di-t-butyl-4-hydroxyphosphonate, tris(3,5-di-t-butyl-4-hydroxybenzyl)-isocyanurate and di-octadecyl-2-(3-t-butyl-5-methyl-4-hydroxybenzyl)malonate; and
e. from 0 to 5 percent by weight based on the weight of polymer of an organosulfur synergist selected from dilaurylthiodipropionate and distearylthiodipropionate.

2. A composition according to claim 1 which comprises
a. polypropylene
b. nickel bis-3,5-di-t-butyl-4-hydroxybenzoate
c. n-octadecyl-3,5-di-t-butyl-4-hydroxybenzoate.

3. A composition according to claim 1 which comprises
a. polypropylene
b. nickel bis-3,5-di-t-butyl-4-hydroxybenzoate
c. 2,4-di-t-butylphenyl 3,5-di-t-butyl-4-hydroxybenzoate.

4. A composition according to claim 1 which comprises
a. polypropylene
b. nickel 3,5-di-t-butyl-4-hydroxybenzoate
c. n-octadecyl-3,5-di-t-butyl-4-hydroxybenzoate
d. n-octadecyl 3(3',5'-di-t-butyl-4'-hydroxyphenyl)-propionate.

5. A composition according to claim 1 which comprises
a. polypropylene
b. nickel-bis-3,5-di-t-butyl-4-hydroxybenzoate
c. 2,4-di-t-butylphenyl 3,5-di-t-butyl-4-hydroxybenzoate
d. n-octadecyl 3(3',5'-di-t-butyl-4'-hydroxyphenyl)-propionate.

6. A composition according to claim 1 which comprises
a. polypropylene
b. nickel-bis-3,5-di-t-butyl-4-hydroxybenzoate
c. n-octadecyl-3,5-di-t-butyl-4-hydroxybenzoate
d. n-octadecyl-3(3',5'-di-t-butyl-4'-hydroxyphenyl)-propionate
e. distearylthiodipropionate.

* * * * *